(12) United States Patent
Okuyama

(10) Patent No.: US 7,513,520 B2
(45) Date of Patent: Apr. 7, 2009

(54) POWERED STEP DEVICE OF MOTOR VEHICLE

(75) Inventor: Keiichiro Okuyama, Yamanashi (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 256 days.

(21) Appl. No.: 11/345,240

(22) Filed: Feb. 2, 2006

(65) Prior Publication Data

US 2006/0255558 A1 Nov. 16, 2006

(30) Foreign Application Priority Data

May 10, 2005 (JP) .............................. 2005-137765
May 10, 2005 (JP) .............................. 2005-137766

(51) Int. Cl.
*B60R 3/02* (2006.01)
(52) U.S. Cl. ...................................................... 280/166
(58) Field of Classification Search ................ 280/163, 280/164.1, 166, 847, 848
See application file for complete search history.

(56) References Cited

U.S. PATENT DOCUMENTS 4,257,620 A * 3/1981 Okland ........................ 280/848

5,090,715 A * 2/1992 Nakajima et al. ............ 280/166
5,108,129 A * 4/1992 Olsen .......................... 280/850
5,194,199 A * 3/1993 Thum ......................... 264/46.6

FOREIGN PATENT DOCUMENTS

| JP | 9-95182 | * | 4/1997 |
| JP | 11-227528 A | | 8/1999 |
| JP | 2002-104071 | * | 4/2002 |

* cited by examiner

*Primary Examiner*—Frank B Vanaman
(74) *Attorney, Agent, or Firm*—Foley & Lardner LLP

(57) ABSTRACT

A powered step device of a vehicle comprises a base member that is adapted to be connected to a vehicle body; a pivoting mechanism held by the base member, the pivoting mechanism being horizontally movable between a first position wherein a given part thereof takes a retracted position relative to the base member and a second position wherein the given part takes a projected position relative to the base member; a step plate connected to the given part of the pivoting mechanism, so that the first and second positions of the pivoting mechanism induce retracted and projected positions of the step plate relative to the base member; and an electric actuator that moves the pivoting mechanism with electric power. The powered step device further comprises a guard member that is fixed to the base member in a manner to cover and protect the pivoting mechanism.

11 Claims, 8 Drawing Sheets

POWERED STEP DEVICE OF MOTOR VEHICLE

BACKGROUND OF THE INVENTION

1. Field of the Invention

The present invention relates in general to a step device that is installed below a door opening of a motor vehicle for assisting the passengers who get on and off the vehicle, and more particularly to a step device of powered retractable type having a step plate that can be retracted inside the vehicle with electric power when not in use.

2. Description of the Related Art

Hitherto, various powered step devices of motor vehicles have been proposed and put into practical use particularly in the field of van type vehicles, buses and the like.

One of such known powered step devices is shown in Laid-open Japanese Patent Application (Tokkaihei) 11-227528 filed on Feb. 17, 1998 (matured to Japanese Patent 3612418 on Oct. 29, 2004), which generally comprises two supporting arms that are pivotally connected to the vehicle body, a step plate that is held by the supporting arms and an electric drive mechanism that moves, with electric power, the supporting arms between a projected position wherein the step plate is projected from the vehicle body to work as a step for the door opening and a retracted position wherein the step plate is retraced into the vehicle body.

SUMMARY OF THE INVENTION

However, due to its inherent construction, the powered step device of the above-mentioned Japanese Patent has the following shortcomings.

That is, even in the retracted position, the two supporting arms are exposed to the outside of the device due to their inherent construction. Such projection of the supporting arms outside of the device tends to induce a high possibility of collision with stones or the like that would be kicked or smashed by the front road wheels of the vehicle under running. Of course, such collision damages the supporting arms. Furthermore, the exposed appearance of the supporting arms lowers the aesthetic value of the powered step device.

Furthermore, the powered step device of the Japanese Patent has a relatively thicker construction because the essential parts of the device are arranged to overlap one another in a vertical direction. Furthermore, due to inherent construction of the device, an increase in thickness of each part is inevitably necessary for providing the step device with a sufficient mechanical strength. However, the thickness increase of the parts brings about not only increase in weight and size but also increase in cost of the step device.

It is therefore an object of the present invention to provide a powered step device of a motor vehicle, which is free of the above-mentioned drawbacks.

In accordance with the present invention, there is provided a powered step device of a motor vehicle, which is equipped with a guard means that covers and guards the supporting arms.

In accordance with the present invention, there is provided a powered step device of a motor vehicle, of which pivoting mechanism is thinner in construction.

In accordance with a first aspect of the present invention, there is provided a powered step device of a vehicle, which comprises a base member that is adapted to be connected to a vehicle body; a pivoting mechanism held by the base member, the pivoting mechanism being horizontally movable between a first position wherein a given part thereof takes a retracted position relative to the base member and a second position wherein the given part takes a projected position relative to the base member; a step plate connected to the given part of the pivoting mechanism, so that the first and second positions of the pivoting mechanism induce retracted and projected positions of the step plate relative to the base member; an electric actuator that moves the pivoting mechanism with electric power; and a guard member fixed to the base member in a manner to cover and protect the pivoting mechanism.

In accordance with a second aspect of the present invention, there is provided a powered step device of a motor vehicle, which comprises a base member that is adapted to be connected to a vehicle body; a pivoting mechanism held by the base member, the pivoting mechanism being horizontally movable between a first position wherein a given part thereof takes a retracted position relative to the base member and a second position wherein the given part of the pivoting mechanism takes a projected position relative to the base member; a bracket that is pivotally connected to the given part of the pivoting mechanism through a shaft; a step plate connected to the bracket, so that the first and second positions of the pivoting mechanism induce retracted and projected positions of the step plate relative to the base member; and an electric actuator that moves the pivoting mechanism with electric power, wherein the bracket comprises an upper flat part; a lower flat part; and a bridge part that extends between the upper and lower flat parts thereby to define between the upper and lower flat parts a space in which the given part is put through a bearing member, the bearing member being pivotally connected to the bracket through the shaft.

BRIEF DESCRIPTION OF THE DRAWINGS

Other objects and advantages of the present invention are apparent from the following description when taken in conjunction with the accompanying drawings, in which.

DETAILED DESCRIPTION OF THE INVENTION

In the following, a powered step device 4 of a motor vehicle of the present invention will be described with reference to the accompanying drawings.

For ease of understanding, various directional terms, such as, right, left, upper, lower, rightward and the like are used in the following description. However, such terms are to be understood with respect to only a drawing or drawings on which a corresponding part or parts are shown.

Figure 1:
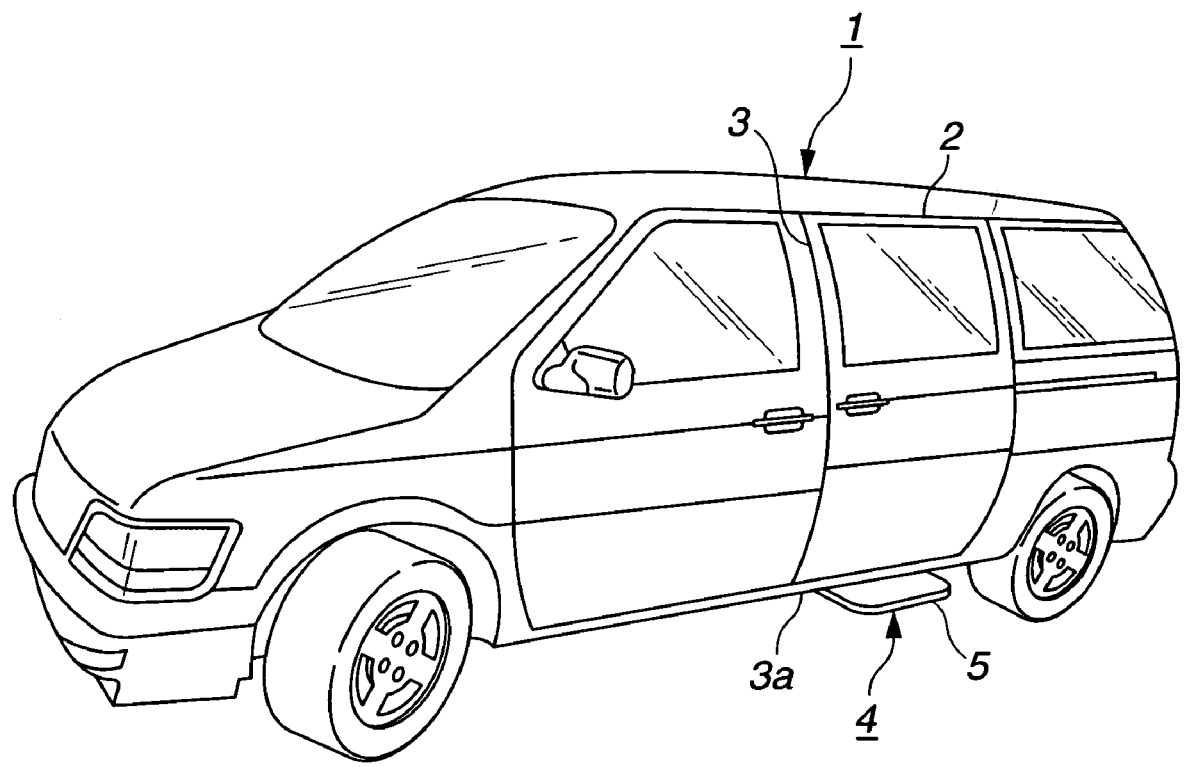
FIG. 1 is a perspective view of a van-type motor vehicle to which a powered step device of the present invention is practically applied.

Referring to FIG. 1, there is shown by example a van-type motor vehicle 1 to which the powered step device 4 of the invention is practically applied. The vehicle 1 is equipped with a slide door 2 that moves forward to close a door opening 3 and moves rearward to open the door opening 3.

The powered step device 4 of the invention is connected to a floor panel 3a of the vehicle 1 at a position just below the door s opening 3. As will become apparent as the description proceeds, when the slide door 2 is opened, a step plate 5 of the step device 4 is projected to the outside to serve as a step for the passengers and when the door 2 is closed, the step plate 5 is retracted under the floor panel 3a.

Figure 2:
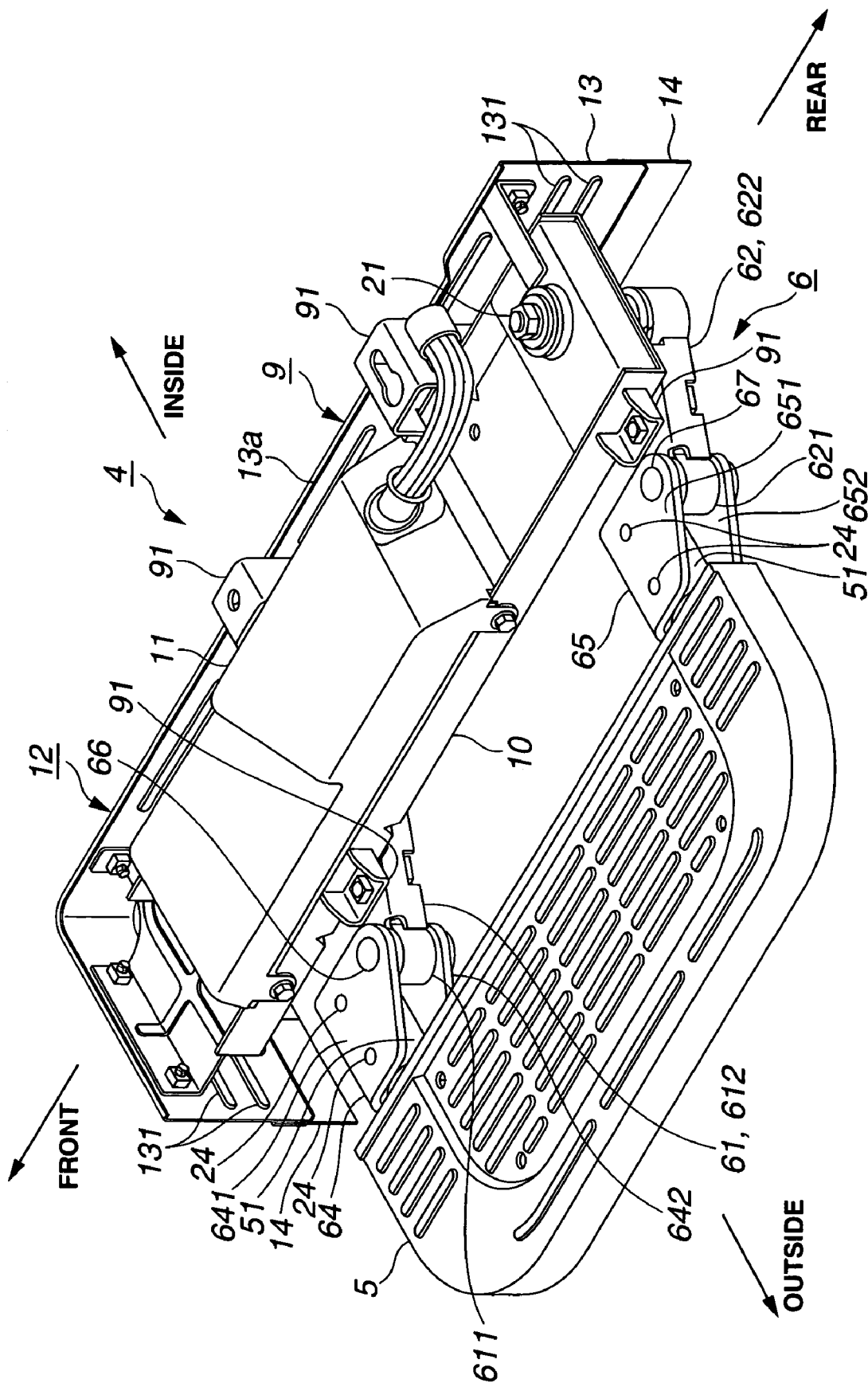
FIG. 2 is a perspective view of the powered step device of the invention in a condition wherein a step plate is projected.

As is shown in FIG. 2, the step device 4 generally comprises a step plate 5 that serves as the step for the passengers, a pivoting mechanism 6 that moves the step plate 5 horizontally between a retracted position (see FIG. 5) and a projected position (see FIGS. 2, 4 and 6), a driving mechanism 8 that drives the pivoting mechanism 6 with a power produced by a reversible electric motor 7 (see FIG. 4), and a base structure 9 that supports both the pivoting mechanism 6 and the driving mechanism 8. As will be described in detail hereinafter, the base structure 9 is secured to a projected portion of the floor panel 3a of the vehicle at a position just below the door opening 3.

Figure 3:
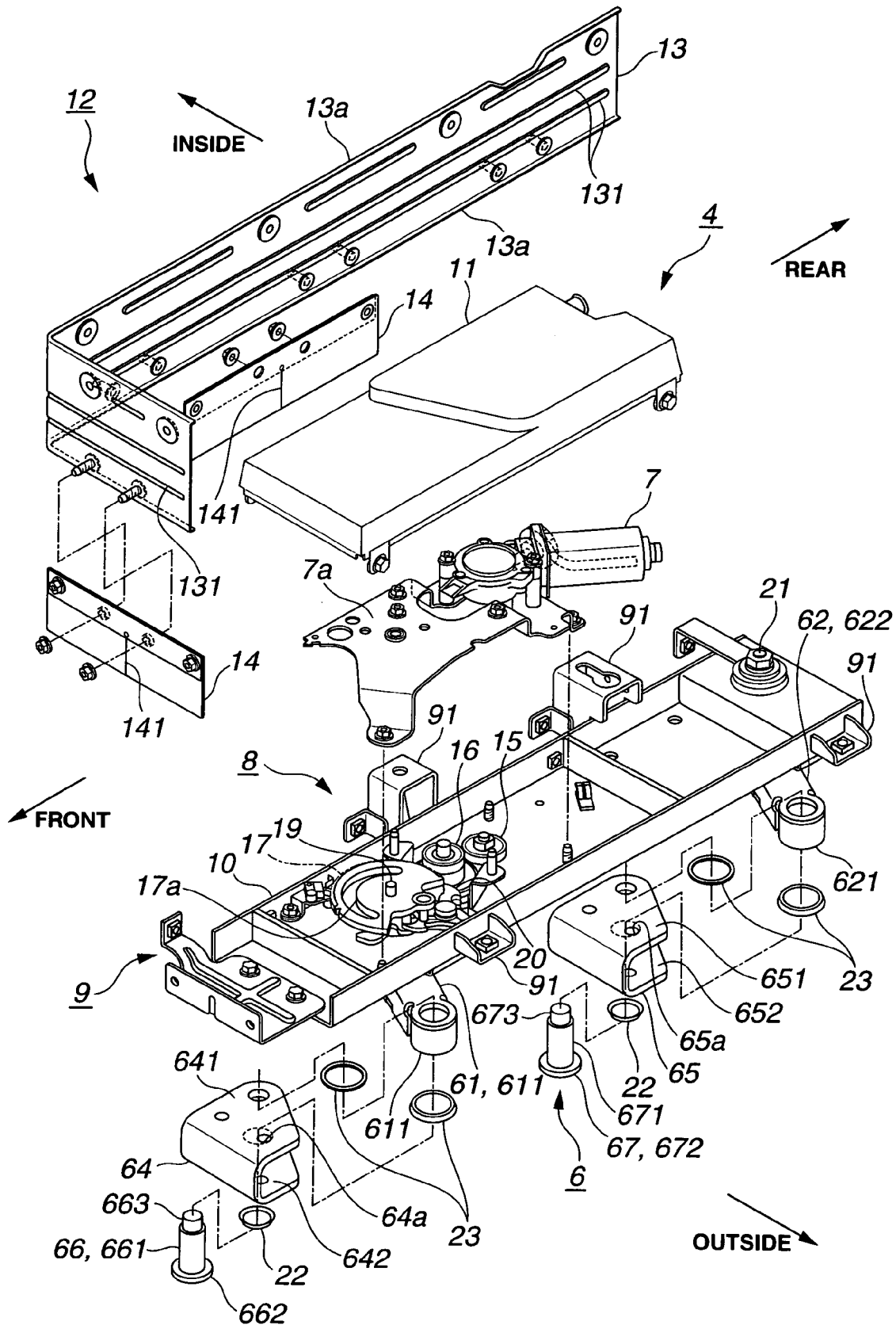
FIG. 3 is an exploded view of the powered step device of the invention with some parts removed for clarification of the drawing.

As is understood from FIGS. 2 and 3, the base structure 9 comprises a metal base plate 10 that is secured to a lower surface of the floor panel 3a of the vehicle through a plurality (four in the illustrated embodiment) of brackets 91.

As is understood from FIG. 3, the base plate 10 is rectangular in shape comprising a rectangular base wall, two longer side walls raised from lateral ends of the base wall and a plurality of short walls raised from the base wall serving as beams. With these longer and shorter walls, the base plate 10 has larger and smaller recesses defined therein. The larger recess is used for accommodating the driving mechanism 8.

As is seen from FIGS. 2 and 3, a rectangular cover 11 of plastic is put on the metallic base plate 10 in a manner to cover the driving mechanism 8.

To a front edge, which faces forward of the vehicle 1, and a side edge, which faces inside of the vehicle 1, of the metal base plate 10, there is fixed an L-shaped guard member 12 of metal. As is seen from FIG. 2, the guard member 12 is arranged to guard and protect an inboard side of the pivoting mechanism 6.

As is seen from FIG. 3, the driving mechanism 8 is set in the larger recess of the base plate 10 and comprises the above-mentioned reversible electric motor 7, speed reduction gears 15 and 16 one (viz., the gear 15) of which is meshed with an output shaft of the motor 7, a sector gear 17 that is meshed with the other (viz., the gear 16) of the speed reduction gears 15 and 16 and an output lever 18 (see FIG. 4) that transmits the power of the sector gear 17 to the pivoting mechanism 6. As is understood from FIG. 2, the entire construction of the driving mechanism 8 is wholly covered by the plastic rectangular cover 11.

Figure 4:
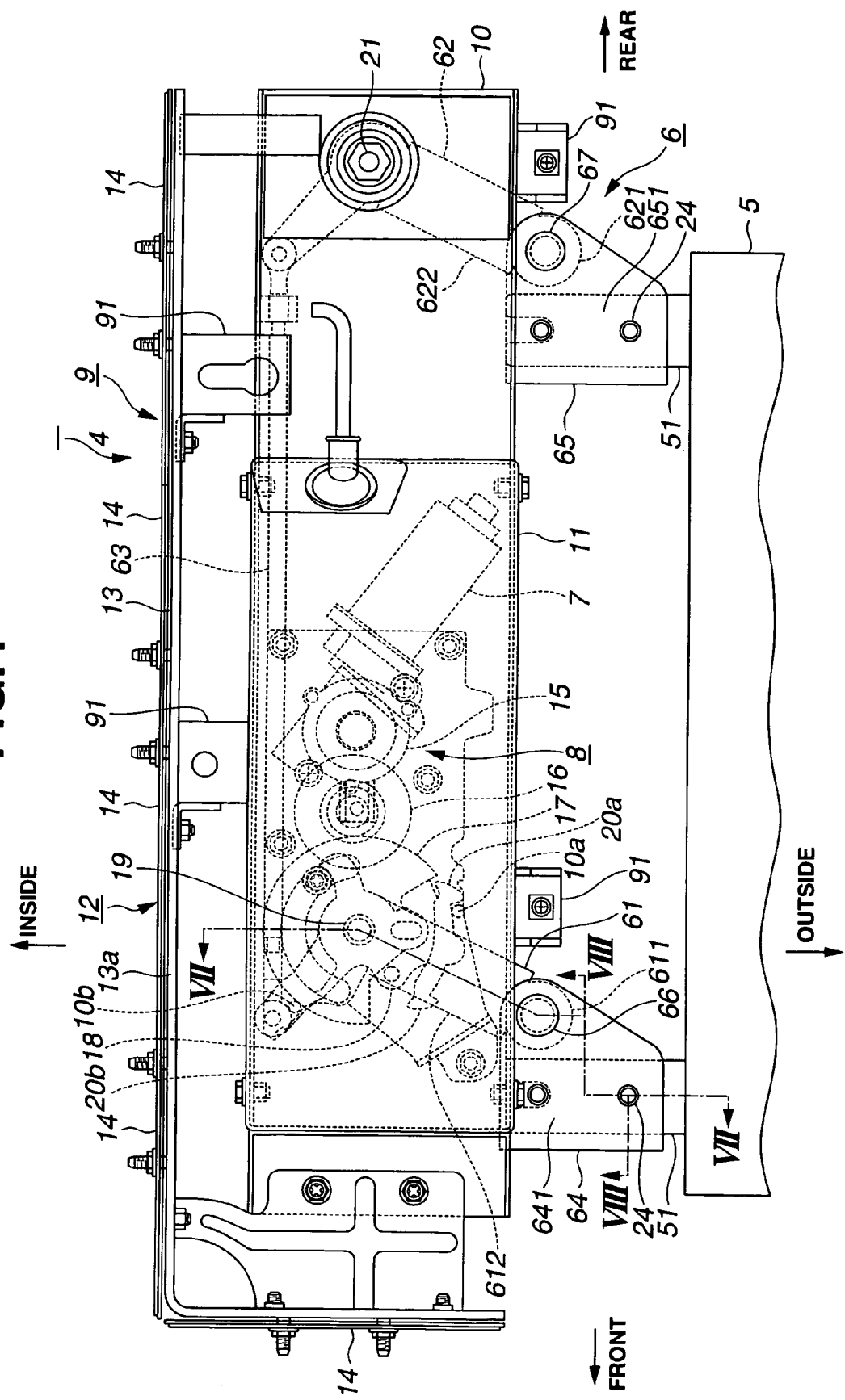
FIG. 4 is a plan view of the powered step device of the invention in a condition wherein the step plate is projected, with some parts removed for clarification of the drawing.
Figure 7:
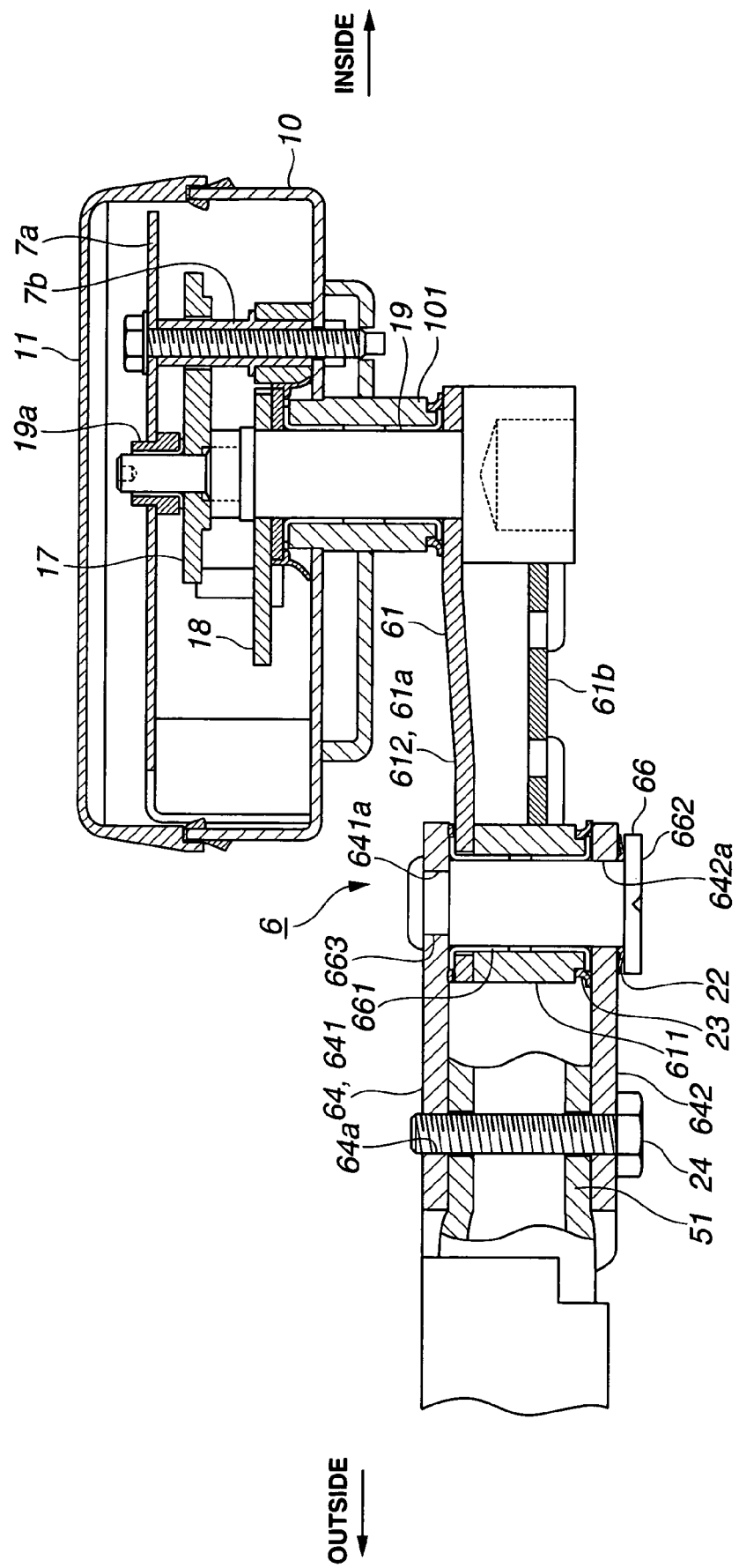
FIG. 7 is an enlarged sectional view taken along the line VII-VII of FIG. 4.

As is seen from FIGS. 4 and 7, the output lever 18 is fixed to a vertically extending shaft 19 that is rotatably held by a bearing portion 101. The bearing portion 101 is provided at a front portion of the larger recess of the base plate 10.

As is seen from FIG. 7, the shaft 19 has a thinner upper portion 19a about which the sector gear 17 rotates.

Figure 9:
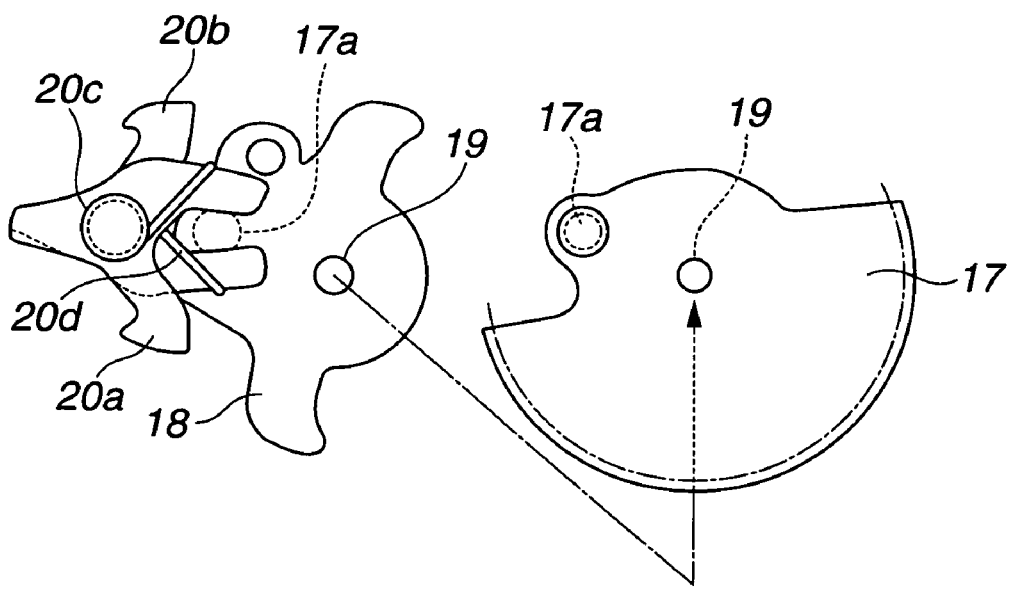
FIG. 9 is a schematically illustrated exploded view of parts of a driving mechanism employed in the powered step device of the invention.

As is seen from FIGS. 7 and 9, the sector gear 17 has a pin 17a projected downward.

As is best understood from FIG. 9, the output lever 18 has two catch levers 20a and 20b pivotally connected thereto through a common shaft 20c. The two catch levers 20a and 20b are arranged to put therebetween a space (no numeral) into which the pin 17a of the sector gear 17 is put. A coil spring 20d is disposed at its center coil portion about the common shaft 20c, having one end hooked to the lever 20a and the other end hooked to the other lever 20b.

With this construction of the catch levers 20a and 20b that are resiliently connected to the pin 17a of the sector gear 17 through the spring 20d, the rotation of the sector gear 17 induces a synchronous rotation of the output lever 18 about the shaft 19 (see FIG. 7).

The detail of the connection between the sector gear 17 and the output lever 18 is described in the above-mentioned Laid-open Japanese Patent Application (Tokkaihei) 11-227528.

Figure 5:
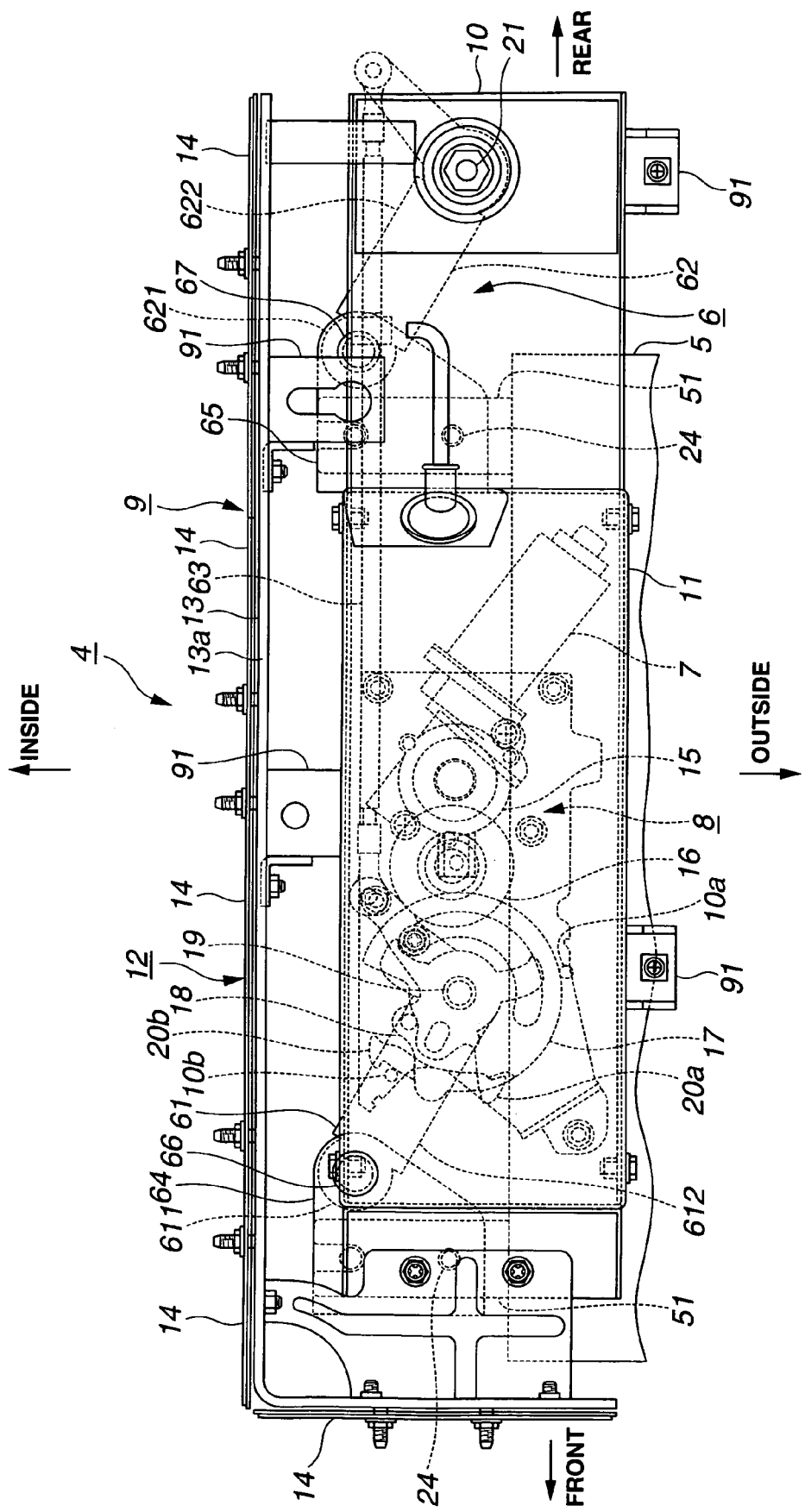
FIG. 5 is a view similar to FIG. 4, but showing a condition wherein the step plate is retracted.

As will become apparent as the description proceeds, when the output gear 18 takes a position as shown in FIG. 4, the step plate 5 assumes its projected position, that is, its operative position, and when the output gear 18 takes a position as shown in FIG. 5, the step plate 5 assumes its retracted position, that is, its inoperative position.

As is seen from FIG. 4, when the step plate 5 assumes the projected operative position, the catch lever 20a is engaged with a first restricting member 10a provided on the base plate 10, and as is seen from FIG. 5, when the step plate 5 assumes the retracted inoperative position, the other catch lever 20b is engaged with a second restricting member 10b provided on the base plate 10. With the engagement with the restricting members 10a and 10b, the step plate 5 can be restrained at the projected or retracted position, which suppresses unexpected movement of the step plate 5 in a cruising of the motor vehicle 1.

As is understood from FIGS. 3 and 7, particularly from FIG. 7, a stopper shaft 7b extends between a base board 7a for the motor 7 (see FIG. 3) and the base plate 10, which passes through an arcuate slot 17a provided by the sector gear 17. Due to provision of the stopper shaft 7b, the turning of the sector gear 17 in clockwise and counterclockwise directions is limited.

As is seen from FIGS. 3, 6 and 7, the pivoting mechanism 6 is positioned below the base plate 10, and comprises an L-shaped first supporting arm 61 of metal that is integrally connected at its base portion to a lower part of the shaft 19 that projects downward through the base plate 10. For the reason as mentioned hereinabove, the first supporting arm 61 is rotatable with the output lever 18.

Figure 6:
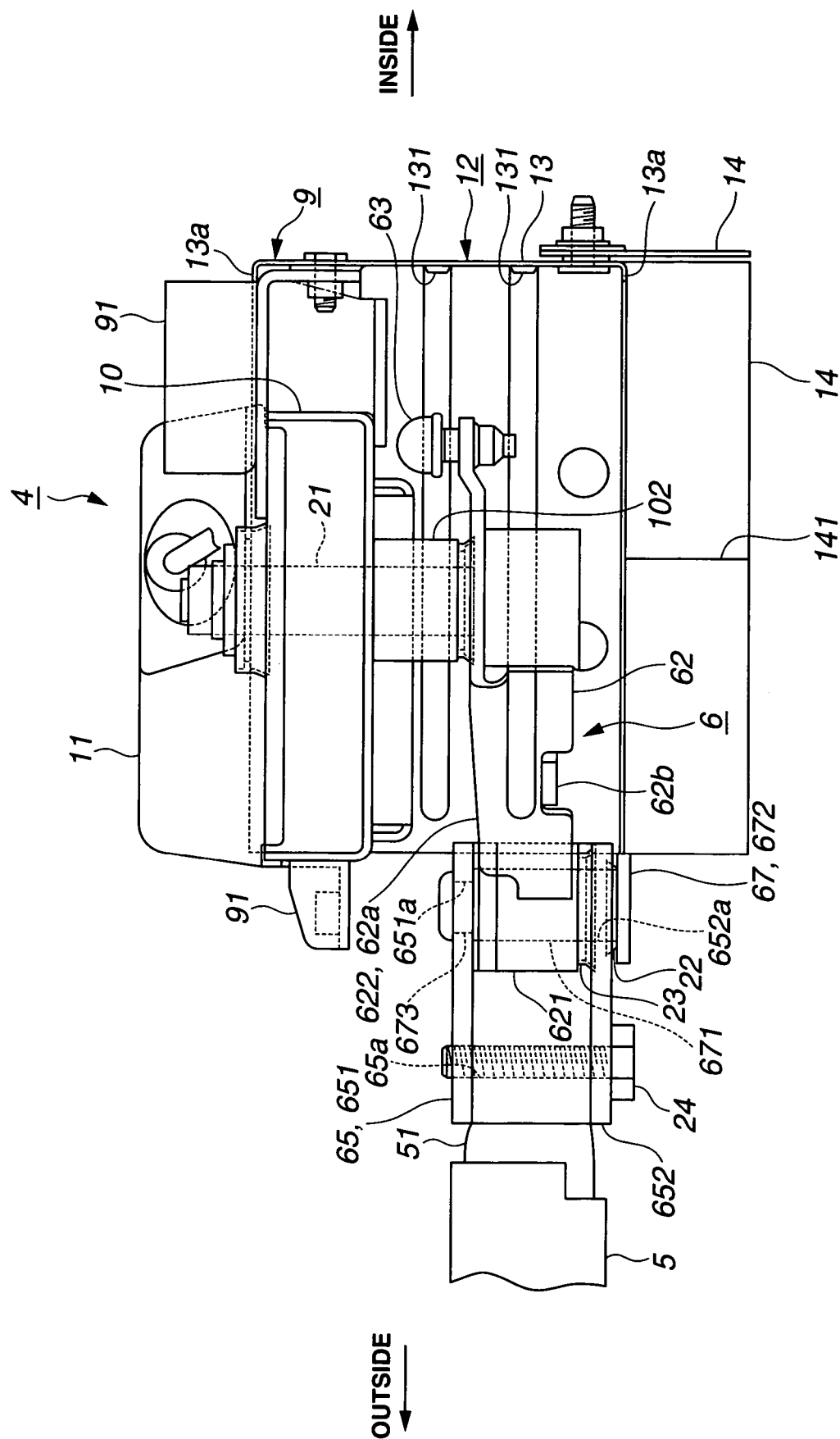
FIG. 6 is a back view of an electric actuator employed in the powered step device of the invention, with some parts removed for clarification of the drawing.

As is best understood from FIGS. 3, 4 and 6, the pivoting mechanism 6 further comprises an L-shaped second supporting arm 62 of metal that is provided at a rear lower side of the base plate 10 and substantially the same with the first arm 61 in shape.

It is to be noted that the first and second supporting arms 61 and 62 are provided through press working.

The second supporting arm 62 is secured at its base portion to a lower end of a shaft 21 that passes through and is rotatably held by a bearing portion 102 (see FIG. 6) provided on the lower surface of the base plate 10. As is seen from FIG. 4, a connecting rod 63 extends between the first and second supporting arms 61 and 62 in such a manner that each end of the connecting rod 63 is pivotally connected to a shorter arm part of the arm 61 or 62. With this, the first and second supporting arms 61 and 62 pivotally move synchronously.

As is seen from FIG. 3, each of the first and second supporting arms 61 and 62 has at a leading end of a longer arm part 612 or 622 thereof a cylindrical bearing member 611 or 621.

Preferably, these bearing members 611 and 621 are welded to the longer arm parts 612 and 622 for achieving a strong connection therebetween.

Because of the construction mentioned hereinabove, the first and second supporting arms 61 and 62 can be made light in weight and low in production cost.

A first bracket 64 of metal is pivotally connected to the cylindrical bearing member 611 through a shaft 66, and a second bracket 65 of metal is pivotally connected to the other bearing member 621 through another shaft 67. As shown, each bracket 64 or 65 has a generally C-shaped cross section.

Thus, when the motor 7 is energized to rotate in one and other directions, the first and second supporting arms 61 and 62 are pivotally and synchronously moved to a projected position as shown in FIG. 4 and a retracted position as shown in FIG. 5. Since the step plate 5 is connected to the first and second brackets 64 and 65 in an after-mentioned manner, the projected and retracted positions of the first and second supporting arms 61 and 62 induce the projected and retracted positions of the step plate 5.

As will be understood from FIGS. 2 and 7, the longer arm parts 612 and 622 of the first and second supporting arms 61 and 62 are welded to the shafts 19 and 21 to achieve a strong connection therebetween.

As will be understood from FIGS. 3, 6 and 7, The longer arm parts 612 and 622 of the first and second supporting arms 61 and 62 are each constructed to have a rectangular cross section. More specifically, the arm 61 or 62 comprises a channel like upper member 61a or 62a and an elongate lower flat member 61b or 62b which are welded to each other.

As is best understood from FIG. 3, the first and second brackets 64 and 65 are produced through press working. Each bracket 64 or 65 comprises an upper flat part 641 or 651, a lower flat part 642 or 652 and a bridge part that extends between the upper and lower flat parts. The bracket 64 or 65 puts between the upper and lower flat parts 641 and 642 (or 651 and 652) thereof the cylindrical bearing member 611 or 621 of the first or second arm 61 62, and pivotally holds the same by using a shaft 66 or 67 that passes through the upper and lower flat parts 641 and 642 (or 651 and 652). This arrangement brings about a thinner construction of the pivoting mechanism 6 and thus a thinner construction of the powered step device of the invention.

As is seen from FIGS. 2 and 4, front and rear frame members 51 and 51 of the step plate 5 are secured to the first and second brackets 64 and 65 respectively.

As is seen from FIG. 3, before being practically used, each shaft 66 or 67 has such a shape as to comprise a stepped shaft portion 661 or 671 standing on a circular base portion 662 or 672.

As is understood from FIG. 7, for practical use, a smaller top portion 663 or 673 of the shaft 66 or 67 is pressed to provide a larger head. That is, in case of connecting the first arm 61 and the first bracket 64, the shaft 66 is put through an opening 642a formed in the lower flat part 642 of the bracket 64, the opening of the cylindrical bearing member 611 of the arm 61 and an opening 641a formed in the upper flat part 641 of the bracket 64, and then the smaller top portion 663 is stamped to have the larger head. With this, the shaft 66 is held in the bracket 64 while pivotally holding the bearing member 611 of the arm 61. An annular seal member 22 of rubber material or the like is practically put between the circular base portion 662 and the lower flat part 642 of the bracket 64. Like this, upper and lower annular seal members 23 and 23 are operatively put between the bearing member 611 and the bracket 64. As will be seen from FIG. 3, the connection between the second supporting arm 62 and the second bracket 65 is made through a mechanism that is substantially the same as that mentioned hereinabove. Because of the construction and arrangement of the brackets 64 and 65 as mentioned hereinabove, the dimensional control of the same can be easily made.

Figure 8:
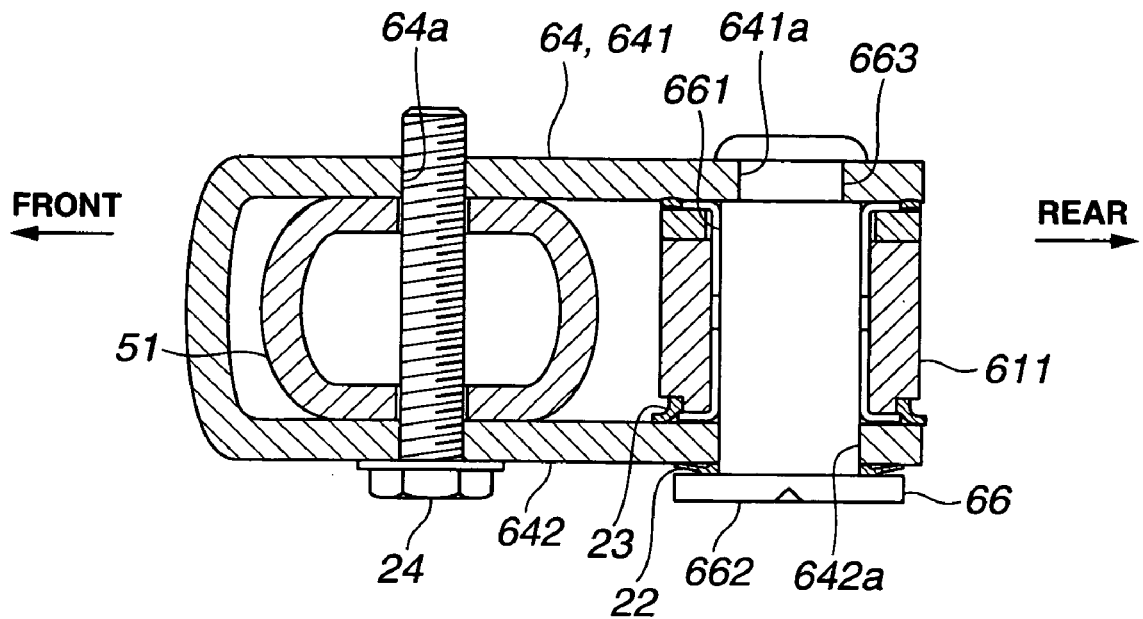
FIG. 8 is an enlarged sectional view taken along the line VIII-VIII of FIG. 4.

As is seen from FIGS. 2, 7 and 8, the front and rear frame members 51 and 51 of the step plate 5 are secured to the first and second brackets 64 and 65 by means of a plurality of connecting bolts 24. As is seen from FIGS. 7 and 8, for this securing, each frame member 51 is put into the bracket 64 or 65, and the connecting bolt 24 is put through aligned openings formed in the bracket 64 or 65 and the frame member 51. In the illustrated embodiment, the openings 64a of the upper flat part 641 of the bracket 64 are threaded to engage with threaded upper parts of the bolts 24. Because of work of the bolts 24, undesired deformation of the first and second brackets 64 and 65, that is, expanding deformation of the upper and lower flat parts thereof is assuredly suppressed, and furthermore, putting the frame members 51 into the brackets 64 and 65 assuredly suppress contracting deformation of the these brackets. The robust connection of the brackets 64 and 65 thus achieved induces a smoothed pivot movement of the brackets 64 and 65 relative to the first and second supporting arms 61 and 62 through the bearing members 611 and 621 of the supporting arms 61 and 62. In other words, the as is seen from FIG. 2, a pivotal movement of the step plate 5 relative to the first and second supporting arms 61 and 62 is assuredly and smoothly made.

As is seen from FIGS. 2 and 3, the L-shaped guard member 12 comprises an L-shaped metal plate 13 that is secured to the base plate 10 and a plurality of flap members 14 of a rubber material that are detachably connected to a lower portion of the L-shaped metal plate 13.

As is seen from the drawings, the L-shaped guard member 12 is arranged to cover the inside and front areas of the first and second supporting arms 61 and 62, the connecting rod 63 and the first and second brackets 64 and 65.

As is seen from FIG. 6, the flap members 14 extend downward to such an extent as to sufficiently cover the essential members 61, 62, 63, 64 and 65 of the pivoting mechanism 6.

As is seen FIG. 3, the L-shaped metal plate 13 is formed at its upper and lower edges with respective flanges 13a that provide the metal plate 13 with a reinforced mechanical strength. Preferably, the flanges 13a may be curled for reducing air resistance created when the vehicle 1 runs. If desired, the front part of the metal plate 13 may be streamlined for that purpose. As shown, the metal plate 13 is formed with horizontally extending beads 131 for much more increasing the mechanical strength of the plate 13.

That is, in the present invention, there is employed an L-shaped guard member 12 which guards and protects the essential parts of the powered step device from stones, mud, water, etc., that would be kicked or smashed by the front road wheels of the vehicle 1 under running. When cruising in a rain, the beads 131 function to force clinging rain water to move in a rearward direction. This is quite important when considering various troubles that would be caused by freezing of remaining water in the device.

As is seen from FIG. 3, each flap member 14 is formed with a slit 141 to increase the flexibility thereof. The increased flexibility of the flat members 14 induced by the provision of the slits 141 improves the covering performance of the guard member 12 to the pivoting mechanism 6. That is, if, the flap members 14 contact with some foreign things on the road, such as, curb stones and the like, only the piece of the flap member 14 that actually contacts the curb stones is subjected to deformation, which protects the covering performance of the guard member 12.

In the following, operation of the powered step device of the invention will be described with reference to the drawings, especially FIGS. 4 and 5.

For ease of understanding, the description will be commenced with respect to the retracted condition of the device that is shown in FIG. 5.

That is, as has been mentioned hereinabove, in this condition, the step plate 5 assumes its retracted inoperative position. In this condition, the catch lever 20b (see FIG. 9) is engaged with the second restricting member 10b of the base plate 10. Due to this engagement, the step plate 5 is stably held in the retracted inoperative position. Of course, in this case, the electric motor 7 is kept OFF.

When, now, the electric motor 7 is energized to run in a given direction, the sector gear 17 (see FIG. 9) is turned in a counterclockwise direction in FIG. 5 breaking the engagement of the catch lever 20b with second restricting member 10b.

Further turning of the sector gear 17 in the same direction induces finally an engagement of the other catch lever 20a with the first restricting member 10a of the base plate as is seen from FIG. 4. During the turning of the sector gear 17, the first and second supporting arms 61 are turned simultaneously in a clockwise direction in the drawing with the aid of the connecting rod 63, gradually projecting the step plate 5 from the base plate 10. Finally, the step plate 5 assumes the projected operative position as shown in FIG. 2. Upon this, energization of the electric motor 7 is stopped. The projected condition of the step plate 5 is stably held by the engagement of the catch lever 20a with the first restricting member 10a.

When the electric motor 7 is energized to rotate in the other direction, the stop plate 5 is moved into the retracted inoperative position operating the parts in a reversed manner.

As is described hereinabove, in the present invention, there is provided a guard member 12 for guarding and protecting the essential parts of the powered step device from stones, mud, water, etc., that would be kicked or smashed by the front road wheels of an associated motor vehicle under running. In the present invention, the guard member 12 is constructed robust and has a function to effectively cover the essential parts. Furthermore, the guard member 12 is simple in construction.

Furthermore, the pivoting mechanism 6 is made simple and thin in construction due to usage of the first and second brackets 64 and 65 each putting therein the front or rear frame member 51 of the step plate 5. Accordingly, the entire construction of the powered step device of the invention that includes the thinner pivoting mechanism 6 is made thin.

The entire contents of Japanese Patent Applications 2005-137765 filed May 10, 2005 and 2005-137766 filed May 10, 2005 are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. A powered step device of a motor vehicle, comprising:
   a base member that is adapted to be connected to a vehicle body;
   a pivoting mechanism held by the base member, the pivoting mechanism being horizontally movable between a first position wherein a given part thereof takes a retracted position relative to the base member and a second position wherein the given part takes a projected position relative to the base member;
   a step plate connected to the given part of the pivoting mechanism, so that the first and second positions of the pivoting mechanism induce retracted and projected positions of the step plate relative to the base member;
   an electric actuator that moves the pivoting mechanism with electric power; and
   a guard member fixed to the base member in a manner to cover and protect the pivoting mechanism;
   wherein the guard member comprises:
      an L-shaped metal plate including a longer part secured to a longer side edge of the base member and a shorter part secured to a shorter edge of the base member, the L-shaped metal plate being arranged to cover side and front portions of the pivoting mechanism; and
      a plurality of flap members having upper ends fixed to a lower part of the L-shaped metal plate, each flap member being made of rubber and provided with at least one slit for increasing the flexibility of the flap member.

2. A powered step device as claimed in claim 1, wherein the L-shaped metal plate is fixed to the base member in a manner to cover and protect the pivoting mechanism.

3. A powered step device as claimed in claim 2, wherein the flap members hang from the guard member.

4. A powered step device as claimed in claim 2, in which the L-shaped metal plate is formed with a plurality of horizontally extending beads for increasing a mechanical strength thereof.

5. A powered step device as claimed in claim 1, in which the L-shaped metal plate is formed with a plurality of beads for increasing the mechanical strength of the L-shaped metal plate.

6. A powered step device as claimed in claim 1, in which the pivoting mechanism comprises:
   first and second supporting arms, each being pivotally connected to the base member, the first supporting arm being powered by the electric actuator;
   a connecting rod pivotally connected at opposed ends thereof to the first and second supporting arms to bring about a simultaneous movement of the first and second supporting arms; and
   first and second brackets respectively and pivotally connected to leading ends of the first and second supporting arms through respective shafts, the first and second brackets being connected to front and rear frame members of the step plate,
   wherein each of the first and second brackets comprises:
      an upper flat part;
      a lower flat part; and
      a bridge part that extends between the upper and lower flat parts thereby to define between the upper and lower flat parts a space in which one of the leading ends of the first and second supporting arms is put through a bearing member, the bearing member being pivotally connected to the bracket through one of the shafts.

7. A powered step device as claimed in claim 6, in which one of the front and rear frame members is received in the space of a bracket and secured thereto through bolts that pass through both the bracket and the frame member.

8. A powered step device as claimed in claim 6, in which each of the first and second supporting arms includes an upper metal channel member and an elongate lower flat metal member which are welded to each other, and in which each of the first and second supporting arms has the leading end secured to the bearing member.

9. A powered step device of a motor vehicle, comprising:
a base member that is adapted to be connected to a vehicle body;
a pivoting mechanism held by the base member, the pivoting mechanism being horizontally movable between a first position wherein a given part thereof takes a retracted position relative to the base member and a second position wherein the given part takes a projected position relative to the base member;
a step plate connected to the given part of the pivoting mechanism, so that the first and second positions of the pivoting mechanism induce retracted and projected positions of the step plate relative to the base member;
an electric actuator that moves the pivoting mechanism with electric power; and
a guard member fixed to the base member in a manner to cover and protect the pivoting mechanism:
wherein the pivoting mechanism comprises:
first and second supporting arms, each being pivotally connected to the base member, the first supporting arm being powered by the electric actuator;
a connecting rod pivotally connected at opposed ends thereof to the first and second supporting and to bring about a simultaneous movement of the first and second supporting arms; and
first and second brackets respectively and pivotally connected to leading ends of the first and second supporting arms through respective shafts, the first and second brackets being connected to front and rear frame members of the step plate, wherein each of the first and second brackets comprises:
an upper flat part;
a lower flat part; and
a bridge part that extends between the upper and lower flat parts thereby to define between the upper and lower flat parts a space in which one of the leading ends of the first and second supporting arms is put through a bearing member, the bearing member being pivotally connected to the bracket through one of the shafts;
wherein each shaft comprises:
a circular base portion; and
a stepped shaft portion standing on the circular base portion, the stepped shaft portion passing through both an opening formed in the lower flat part of the bracket and the bearing member and having a smaller top portion passing through an opening formed in the upper flat part of the bracket, the smaller top portion being pressed to constitute an enlarged head.

10. A powered step device of a motor vehicle, comprising:
a base member that is adapted to be connected to a vehicle body;
a pivoting mechanism held by the base member, the pivoting mechanism being horizontally movable between a first position wherein a given part thereof takes a retracted position relative to the base member and a second position wherein the given part of the pivoting mechanism takes a projected position relative to the base member;
a bracket that is pivotally connected to the given part of the pivoting mechanism through a shaft;
a step plate connected to the bracket, so that the first and second positions of the pivoting mechanism induce retracted and projected positions of the step plate relative to the base member; and
an electric actuator that moves the pivoting mechanism with electric power,
wherein the bracket comprises:
an upper flat part;
a lower flat part; and
a bridge part that extends between the upper and lower flat parts thereby to define between the upper and lower flat parts a space in which the given part is put through a bearing member, the bearing member being pivotally connected to the bracket through the shaft;
wherein the shaft comprises:
a circular base portion;
a stepped shaft portion standing on the circular base portion, the stepped shaft portion passing through both an opening formed in the lower flat part of the bracket and the bearing member and having a smaller top portion passing through an opening formed in the upper flat part of the bracket, the smaller top portion being pressed to constitute an enlarged head.

11. A powered step device as claimed in claim 10, in which the given part of the pivoting mechanism includes an upper metal channel member and an elongate lower flat metal member which are welded to each other to constitute a hollow supporting arm, and in which the hollow supporting arm having a leading end secured to the bearing member.

* * * * *